June 24, 1958 G. HAUGK ET AL 2,840,728

NON-SATURATING TRANSISTOR CIRCUITS

Filed April 26, 1955

INVENTORS G. HAUGK
K. K. KENNEDY
BY
ATTORNEY

United States Patent Office 2,840,728
Patented June 24, 1958

2,840,728

NON-SATURATING TRANSISTOR CIRCUITS

George Haugk, Jersey City, and Kenneth K. Kennedy, West Caldwell, N. J., assignors to Bell Telephone Laboratories, Incorporated, New York, N. Y., a corporation of New York Application April 26, 1955, Serial No. 503,888

6 Claims. (Cl. 307—88.5)

Figure 1:
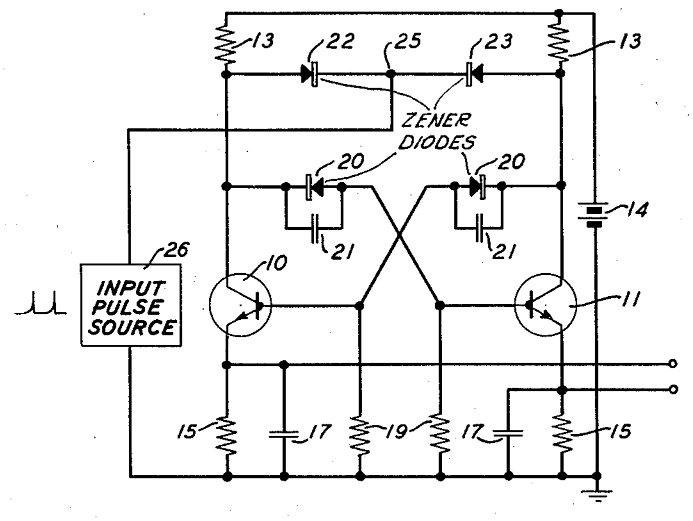

This invention relates to non-saturating transistor circuits and more particularly to such circuits of the bistable multivibrator type.

Bistable trigger circuits, such as of the well known Eccles-Jordan type, have been employed in a great many electrical circuits where it is desired to store information as one or the other of the two states of the circuit. These circuits, in order to be utilized in high frequency information handling systems, must have a very rapid response. However, when transistors are utilized as the conducting elements of the trigger circuit, it has been found that the circuits respond very sluggishly to triggering pulses which are to change their state. This is due to a saturation effect in which the switching action initiated by the triggering pulse drives one transistor to cut-off and the other transistor to saturation. At saturation there is an excess of minority carriers in the semiconductor body. Because of this, transistors which are driven into saturation become insensitive to applied pulses, requiring an additional period of time after the pulse is applied to turn off due to the necessity of sweeping out or removing these excess minority carriers.

In application Serial No. 440,062, filed June 29, 1954, of J. G. Linvill and R. L. Wallace, Jr., it is proposed that the transistors of a bistable counter circuit be kept out of saturation by providing an electrical path between the collectors of the two transistors, the electrical path including back-to-back threshold or breakdown diodes; the input pulses are then applied to the common terminal between the two diodes. Such diodes, which are described in an article by Pearson and Sawyer in the Proceedings of the Institute of Radio Engineers for November 1952 (volume 40, page 348) and in application Serial No. 211,212, filed February 16, 1951, of W. Shockley, now Patent No. 2,714,702, issued August 2, 1955, are characterized by having low forward and reverse resistances over specified voltage ranges. Thus these diodes present a low forward direction resistance and, in the reverse direction, present a high resistance throughout a preassigned voltage range and then a very low variational resistance for reverse voltages beyond this range.

In order to prevent either transistor being driven into saturation by the switching transient, the reverse voltage range of the threshold diodes is so selected that breakdown of one of the diodes takes place when the voltage between the collector electrodes is less, by a safe margin, than the full collector-to-collector voltage swing that would otherwise take place. Accordingly, on each switching transient, one or the other of the threshold diodes will break down to limit the voltage at the collector of the high conduction transistor to a value short of that necessary for saturation. Incidentally, the direct electrical path between the two collectors also acts to limit the voltage excusion of the other transistor to a voltage short of cut-off. Thus both transistors remain in their linear operating conditions and are ready to undergo another switching transient without delay.

However, because of this direct connection between the collectors of the two transistors, this circuit is of necessity a counter circuit in which each applied input pulse must switch the state of the circuit. In a bistable multivibrator or flip-flop type of circuit, however, a pair of input terminals are provided with the possibility that pulses applied to either of these terminals will not switch the state of the circuit.

It is an object of this invention to provide an improved transistor bistable multivibrator or flip-flop circuit.

It is a further object of this invention to provide a transistor bistable multivibrator or flip-flop circuit in which neither transistor can be driven into saturation, thereby preventing saturation degrading the rapidity of response of the circuit.

It is another object of this invention to enable a direct coupling between the collectors of the transistors of a bistable multivibrator circuit to be utilized to prevent either transistor from being driven into saturation while at the same time removing that coupling during the application of the triggering pulse.

These and other objects of this invention are attained in one illustrative embodiment wherein a direct coupling path is provided between the collectors of the transistors of the multivibrator circuit, as described above, to terminate the switching transient before either transistor could be driven into saturation, the path including a pair of threshold or breakdown diodes, sometimes also referred to as Zener diodes. Also included in this path, in accordance with an aspect of this invention, is an impedance element or network having a high value of impedance to transient conditions; in this specific embodiment, this network contains an inductor and a resistor. The input terminals are provided on either side of the network, the input pulses thus being applied through the respective threshold diodes to the collectors of the transistors.

In accordance with this invention, the conducting path between the collectors of the transistors is functionally different at different times in the operation of the circuit. When the triggering pulse is applied to either terminal, the pulse is applied between the network and the threshold device for that transistor and terminal. During the application of the pulse, the inductor has a high value of impedance and effectively decouples the coupling path, blocking the pulse from the other threshold diode and transistor. The pulse may advantageously be of a polarity to cut off the transistor to which it is applied; if that transistor is already in its low conduction state, the circuit is not changed by the application of the input pulse. However, if that transistor had been in its high conduction state, the input pulse initiates a switching transient through the cross-connections between the collectors and bases of the transistors, as is known in the art, which tends to cut off this transistor and drive the other transistor towards its high conduction state and saturation. The impedance interposed in the direct coupling path between the collectors by the inductance decreases rapidly on removal of the pulse so that when the potential between the two collectors has reached, due to the build-up through the switching transient, the reverse breakdown voltage of the threshold diode, the inductor introduces no impedance in the coupling path and substantially a short circuit is provided between the two collectors with the collectors separated by the reverse breakdown voltage of the threshold diode.

Accordingly, during the operation of the circuit the coupling path is effectively not present when the triggering pulse is applied, is reestablished during the buildup of the switching transient when its presence is not required, and is a direct low impedance path when desired to prevent the potential difference between the two collectors being sufficient to drive either transistor into saturation.

It is a feature of this invention that a transistor bistable multivibrator circuit comprise a pair of transistors cross-connected to define a multivibrator circuit and having a direct electrical path between the collectors of the two transistors, the electrical path including a pair of threshold or breakdown diodes and an impedance network interposed between the diodes and having a high impedance to transient conditions only.

It is another feature of a specific illustrative embodiment of this invention that an inductor be interposed in the electrical path between the two transistor collectors.

It is a further feature of this invention that the inputs be applied on opposite sides of the impedance or inductor in the conducting path, the inductor preventing the initiating pulse being applied to other than the desired transistor regardless of the prior state of that transistor.

Figure 2:
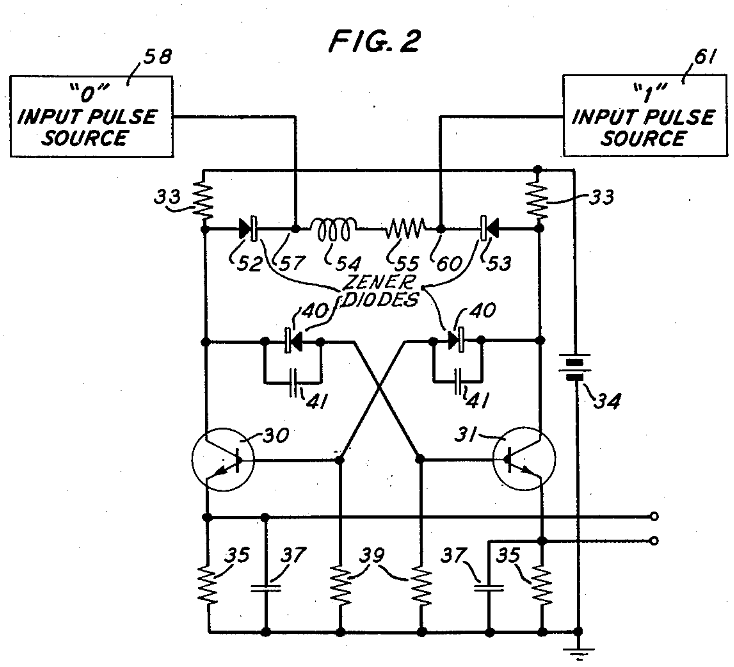

A complete understanding of this invention and of these and other features thereof may be gained from consideration of the following detailed description together with the accompanying drawing, in which:

Fig. 1 is a schematic representation of a single input binary counter circuit of the type disclosed in application Serial No. 440,062, filed June 29, 1954, of J. G. Linvill and R. L. Wallace, Jr.; and Fig. 2 is a schematic representation of a bistable multivibrator circuit in accordance with one specific illustrative embodiment of this invention.

Referring now to Fig. 1, there is depicted a trigger circuit of the type disclosed in application Serial No. 440,062, filed June 29, 1954, of J. G. Linvill and R. L. Wallace, Jr., wherein threshold, breakdown, or saturation diodes are employed to prevent the transistors of the circuit being driven into saturation and thus to increase the speed of response of the circuit. The trigger circuit comprises a pair of transistors 10 and 11 which may advantageously be junction transistors of the n-p-n type. Resistors 13 connect the respective collectors of the transistors to one terminal of a source 14 of operating potential and resistors 15 connect the respective emitters to the other terminal of source 14. Condensers 17 advantageously shunt the resistors 15. The base electrodes of the transistors are connected directly through resistors 19 to the grounded side of the source 14 and cross-connected through a parallel diode 20 and condenser 21 combination to the collector of the other transistors. Diodes 20 are of the breakdown, threshold, or saturation type, as described in an article by Pearson and Sawyer in the Proceedings of the Institute of Radio Engineers for November 1952 (volume 40, page 348) and in application Serial No. 211,212, filed February 16, 1951, of W. Shockley.

As more fully described in the above-mentioned Linvill-Wallace application, an additional path interconnects the collector electrodes of the transistors and comprises a pair of these threshold diodes 22 and 23. The terminal 25 common to these diodes 22 and 23 is connected to the source 26 of input pulses. With high conduction present in one of the transistors, such as transistor 11, application of a pulse from the source 26 to the input treminal 25 initiates a switching transient which serves to increase the conduction in transistor 10 and decrease the conduction in transistor 11. This proceeds to increase cumulatively in well known fashion and, were it not for the threshold diodes 22 and 23, would ultimately drive the transistor 11 to cutoff and the transistor 10 into saturation. At these points amplification by the transistors, and therefore regeneration in the system as a whole, ceases so that the switching transient is arrested. However, if the switching transient were allowed to proceed this far, the initiation of another transient in the opposite sense is impeded by the sluggishness of the saturated transistor. Instead, the conducting path between the collectors of the transistors 10, 11 including the threshold diodes 22, 23 prevents this.

After the transient has proceeded to such a point that the transistor 11 is approaching cutoff and the transistor 10 is approaching saturation, the difference between the potentials at the two collectors reaches a magnitude such that the diode 22 breaks down due to its inherent characteristics. It holds its breakdown voltage with substantially no change. In its broken down condition, the variational resistance of diode 22 is very small, so that the series combination of this variational resistance with the forward resistance of the diode 23 constitutes a virtual short circuit connection between the collectors of the two transistors 10, 11 which shortly and firmly arrests the increase of the potential difference between them. Thus the switching transient has been fully treminated without driving the transistor 11 to cutoff or the transistor 10 into saturation.

Once the switching transient has been arrested, reactive energy stored in the condensers 17 settles to the steady value which characterizes the stable state in which the transistor 10 conducts more heavily than the transistor 11. The circuit is thus completely at rest and ready without further delay for the initiation of the next switching transient, in the opposite direction, by application of a pulse to the terminal 25.

Due to the electrical path between the two collectors, an input pulse at the terminal 25 always initiates a switching transient. This circuit is thus a binary counter type of circuit with but a single input terminal in which successive input pulses always change the state of the transistors. In many applications, however, it is desirable to have a bistable flip-flop circuit, with a pair of separate inputs, which will similarly have the rapid response of the circuit of Fig. 1 and in which the high conduction transistor is not driven into saturation. What is therefore desired is a circuit in which the electrical path between the two collectors and comprising the back-to-back threshold diodes is present when it is needed to prevent the transistors going into saturation but is not present when initiating pulses are to be applied individually to the respective transistors.

In accordance with this invention, this is provided, as seen in Fig. 2, by applying the separate input pulses to the threshold diodes and by separating the threshold diodes by a circuit element which will impose a high impedance in the path during the interval that the input pulses are being applied. In this manner the path between the two transistor collectors is effectively decoupled or broken while the input pulses are being applied. If the input pulse is applied to a transistor of such a polarity as to initiate a switching transient, the transistor will tend to be cut off and, due to the cross-coupling between the transistor bases and collectors, the other transistor will start to go to its high conduction state. If, however, the input pulse is of a polarity that it does not tend to change the state of the transistor, no switching transient will occur.

Turning now to Fig. 2, in the specific illustrative embodiment of this invention there depicted, a pair of transistors 30, 31 are utilized with the collectors of the transistors being connected through resistors 33 to one side of a source 34 of operating potential and the emitters being connected through resistors 35 to the other side of the source 34. Condensers 37 advantageously shunt the resistors 35. The base electrodes of the transistors are connected directly to the other side of the source 34, which is advantageously the ground potential of the circuit, through resistances 39 and are cross-connected through a parallel diode 40 and condenser 41 combination to the collector electrode of the other transistor. Diodes 40 may advantageously be threshold devices of the type discussed above.

In accordance with an aspect of this invention, a pair of threshold diodes 52 and 53 are connected in an electrical path between the collectors of the transistors 30 and 31. A network having a high impedance to transient voltages is connected between the two diodes 52, 53, and in this specific embodiment comprises an inductor 54 and series connected resistor 55. A first input terminal 57 is provided between the diode 52 and the inductor 54 and the "0" input pulse source 58 is connected to this terminal. A second input terminal 60 is provided between the diode 53 and the resistor 55 and the "1" input pulse source 61 is connected to this terminal. As is well known in bistable multivibrator or flip-flop circuits, pulses may be applied from the pulse sources 58 and 61 in any sequence, not all such pulses accordingly serving to change the state of the circuit. Thus if the circuit is in the state in which a "0" is stored, which we can assume to be when transistor 31 is in its high conduction state and transistor 30 in its low conduction state, a negative pulse at terminal 57 from source 58 will not change the state of the circuit. However, a negative pulse at terminal 60 from the pulse source 61 will initiate a switching transient and change the state of the circuit.

The functioning of the electrical path between the two transistor collectors, in circuits in accordance with this invention, can be best appreciated by considering three distinct and successive intervals in time. In the first interval, a pulse is applied from either pulse source 58 or 61; this pulse may or may not serve to turn off or decrease the conduction in the transistor to which it is applied. In either case the electrical path between the two collectors is to be effectively broken so that the input pulse is applied to one and only one of the transistors. During the second time interval, assuming that the input pulse did in fact initiate a switching transient, the triggering pulse has been removed but the states of the two transistors continue to switch due to the cross-coupling between them provided by the diode 40 and condenser 41 parallel combinations. During this interval the condition of the electrical path is not critical and, in fact, following the high impedance state it assumed during the application of the triggering pulse, it is itself returning toward its low impedance state. In the third interval the potential between the two collectors reaches the breakdown value for the appropriate threshold diode 52 or 53; during this interval the electrical path must be complete and the impedance introduced into the path by the impedance network as well as the total impedance of the path must be sufficiently small so as to keep the conducting unit from being saturated. Thus during this last interval the path serves to limit the potential swing at the collectors of the transistors and thus to prevent either transistor being driven into saturation, as discussed further above.

In one specific illustrative embodiment of this invention wherein the transistors 30 and 31 were n-p-n junction type transistors, the various circuit elements had the following values:

| | | |
|---|---|---|
| Resistance **33** | ohms | 10,000 |
| Resistance **35** | do | 2,000 |
| Resistance **39** | do | 100,000 |
| Resistance **55** | do | 100 |
| Condenser **37** | micromicrofarads | 470 |
| Inductor **54** | henries | .0025 |
| Source **34** | volts | 45 |

In this specific embodiment, condensers 41 were omitted, though in other embodiments they may be employed and be of the order of microfarads. The diodes 52 and 53 were threshold diodes having reverse breakdown or Zener voltages of 5.5 and 6 volts, respectively; diodes 52 and 53 advantageously may have the same Zener voltages or these Zener voltages may differ slightly, as in this embodiment. The diodes 40 were also threshold diodes having reverse breakdown or Zener voltages of 8.5 volts. The input pulses from the "0" and "1" input sources 58 and 61 were A.-C. coupled to the input terminals 57 and 60, respectively, and were 15 volts pulses of a duration of 1.2 microseconds. This embodiment operated with input pulses applied at a repetition rate of from 0 to 10,000 pulses per second.

It is to be understood that the above-described arrangement and the specific values therefor are merely illustrative. Various modifications may readily be made. Thus, in order to decrease the impedance of the electrical path between the two collectors during the third time interval, as discussed above, the resistor 55 may be omitted. Further various other impedance networks may be devised for decoupling the series path. Other modifications may be made by those skilled in the art without departing from the spirit and scope of the invention.

What is claimed is:

1. An electrical circuit comprising a pair of transistors each having an emitter, a collector, and a base, means cross-connecting said collectors and bases to define a bistable circuit, a series path directly connected between said collectors and including a pair of oppositely poled threshold devices, said devices being characterized by a first low resistance condition for voltages thereacross which are of one polarity and any magnitude, by a second low resistance condition for voltages thereacross which are of the opposite polarity and of magnitude exceeding a preassigned threshold value, and by an intermediate high resistance condition, said path also including impedance means between said devices to isolate said devices only on application of pulses to either of said devices, and input means individually connected to said path at opposite ends of said impedance means for placing one or the other of said transistors in its high conduction state.

2. A bistable multivibrator circuit comprising a pair of transistors each having an emitter, a collector, and a base, means cross-coupling said collectors and said bases, and means for applying triggering pulses individually to said transistors while preventing the switching transients initiated by said pulses from driving either of said transistors into saturation, said last-mentioned means including a direct series path electrically connected between said collectors and including a pair of oppositely poled threshold devices, said devices being characterized by a first low resistance condition for voltages thereacross which are of one polarity and any magnitude, by a second low resistance condition for voltages thereacross which are of the opposite polarity and of any magnitude exceeding a preassigned threshold value, and by an intermediate high resistance condition, said path also including means for effectively electrically decoupling said path on application of said triggering pulses, said decoupling means including an impedance network connected in series between said devices and having a high impedance to transient voltages only, and input means individually connected to said path at opposite ends of said impedance means for placing one or the other of said transistors in its high conduction state.

3. A bistable multivibrator circuit in accordance with claim 2 wherein said impedance network comprises an inductor connected between said devices.

4. A bistable multivibrator circuit comprising a pair of transistors, each having an emitter, a collector, and a base, means cross-coupling said collectors and said bases, a series path directly connecting said collectors, said path including a pair of oppositely poled threshold devices, said devices being characterized by a first low resistance condition for voltages thereacross which are of one polarity and any magnitude, by a second low resistance condition for voltages thereacross which are of the opposite polarity and of a magnitude exceeding a preassigned threshold value, and by an intermediate high resistance condition, input means for applying triggering pulses individually through said devices to said transistors, and means for effectively decoupling said series path on application of said triggering pulses and at the start of the switching transient initiated thereby whereby said triggering pulses are applied to only one of said transistors and for allowing said series path to present a low impedance between said collectors at the end of said switching transient whereby said transistors are not driven into saturation by said switching transient, said last-mentioned means including an impedance network connected in series between said devices, said network having a high impedance for transient voltages only.

5. A bistable multivibrator circuit in accordance with claim 4 wherein said impedance network comprises an inductor.

6. A bistable multivibrator circuit in accordance with claim 5 wherein said means applying said triggering pulses individually through said devices to said transistors includes a first input terminal between one side of said inductor and one of said devices and a second input terminal between the other side of said inductor and the other of said devices and individual input pulse source means connected to said input terminals.

References Cited in the file of this patent

UNITED STATES PATENTS

| | | |
|---|---|---|
| 2,569,345 | Shea | Sept. 25, 1951 |
| 2,655,609 | Shockley | Oct. 13, 1953 |
| 2,665,845 | Trent | Jan. 12, 1954 |
| 2,714,702 | Shockley | Aug. 2, 1955 |